UNITED STATES PATENT OFFICE.

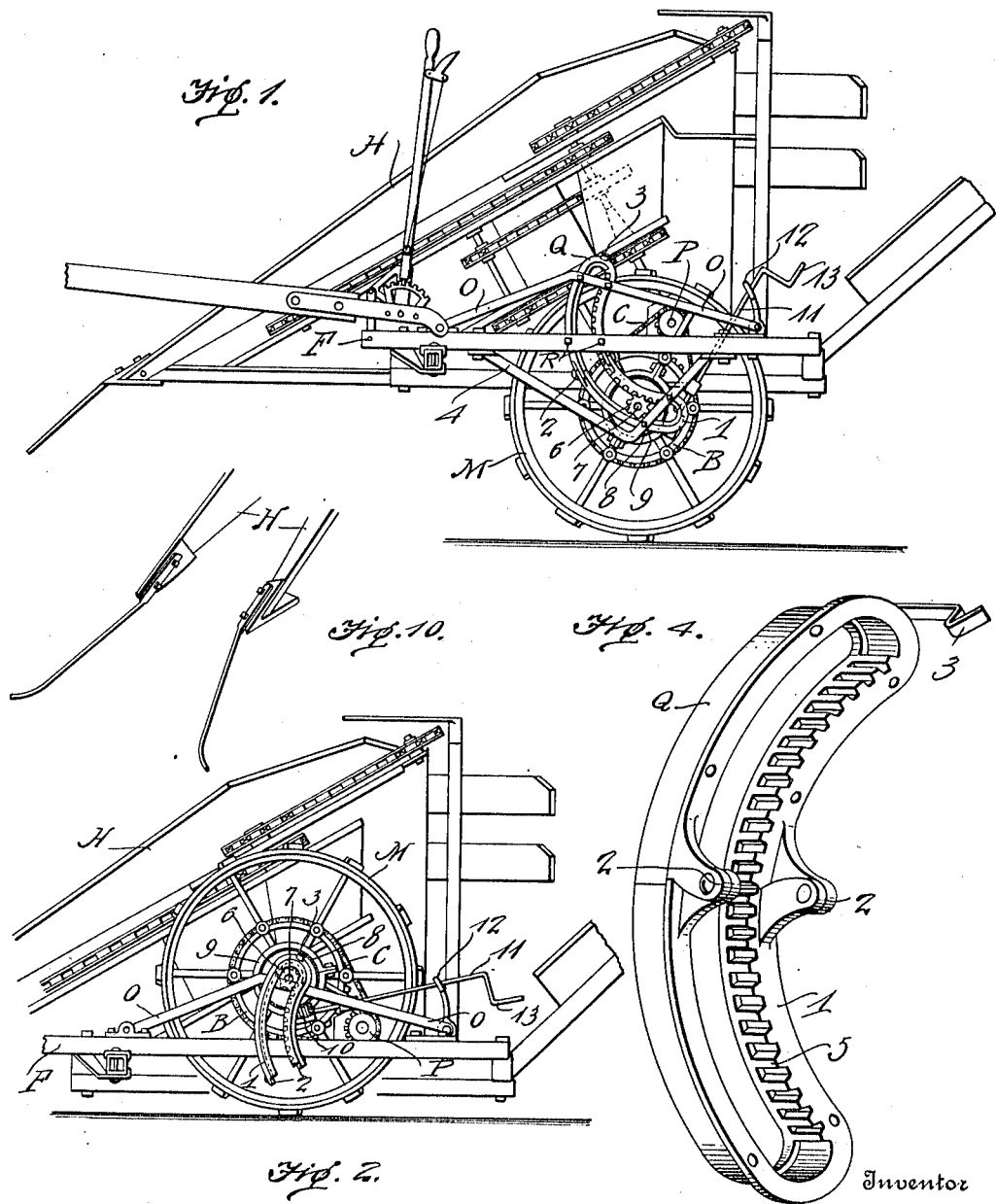

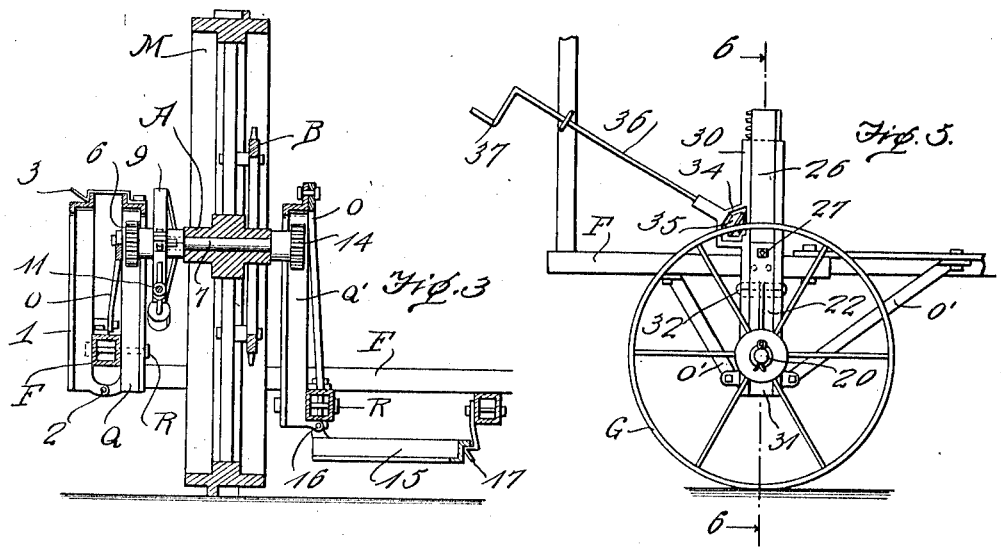
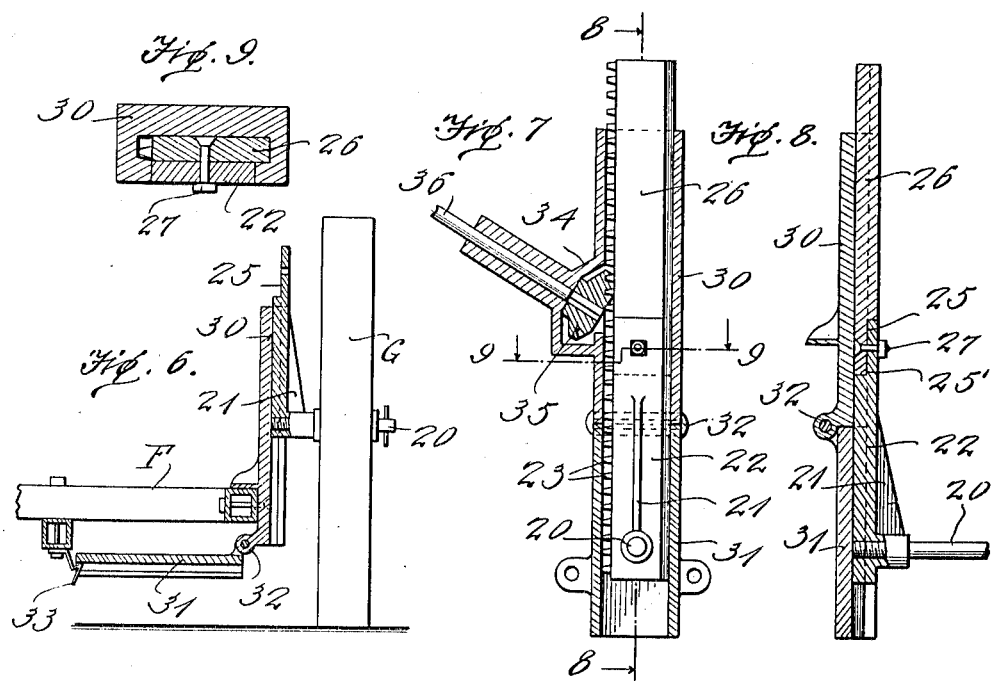

GEORGE H. PALLADY, OF ALLERTON, IOWA.

CORN-HARVESTER.

1,096,744.   Specification of Letters Patent.   Patented May 12, 1914.

Application filed February 6, 1913. Serial No. 746,611.

*To all whom it may concern:*

Be it known that I, GEORGE H. PALLADY, a citizen of the United States, residing at Allerton, in the county of Wayne and State of Iowa, have invented certain new and useful Improvements in Corn-Harvesters; and I do declare the following to be a full, clear, and exact description of the invention, such as will enable others skilled in the art to which it appertains to make and use the same.

This invention relates to harvesters, and more especially to those adapted for cutting corn and like cereals; and the object of the same is to improve the construction of the mechanism for permitting the vertical adjustment of the entire framework so that the cutting apparatus can travel near the ground at times or can be set higher as when the corn or other cereal is to be topped. This object is carried out by constructing the quandrant rack for supporting the main wheel and the straight rack and its guide for supporting the grain wheel in a peculiar manner, and adapting the details of coacting parts thereto; all as hereinafter more fully described and claimed, and as shown in the drawings wherein—

Figure 1 is a side elevation of the complete machine with the framework raised to practically its highest extent, and Fig. 2 is a similar side elevation with the framework lowered and the quadrant rack folded upward and latched in place. Fig. 3 is a vertical section on an enlarged scale, taken through the main wheel and the parts connected therewith while they stand in the position shown in Fig. 2. Fig. 4 is a still further enlarged perspective detail of the quadrant rack. Fig. 5 is an elevation of the grain wheel at the other side of the machine. Fig. 6 is an enlarged vertical section through the lower portion of the rack bar and all of the guides at this side of the machine, taken on the line 6—6 of Fig. 5. Fig. 7 is a still further enlarged vertical section through said rack bar and guide, and Fig. 8 is a vertical section on the line 8—8 of Fig. 7. Fig. 9 is a cross section on the line 9—9 of Fig. 7. Fig. 10 is a perspective detail of the guide fingers at the front end of the harvester.

In the drawings the letter H designates a harvester or binder of that type having a frame F supported on a main wheel M and a grain wheel G at opposite sides, and the cutting apparatus (and binding apparatus if the machine be a binder) is driven from a power wheel P which in the present instance is connected by a chain C with a bull wheel B secured to the spokes, hub or hollow axle A of the main wheel M as best seen in Fig. 3. It is common in machines of this character to adjust the entire framework with respect to the hub of the main and grain wheels so that the cutting apparatus will travel nearer the ground or farther from it as conditions may require, and as the mechanism is driven by gearing or chain connection with the gear or bull wheel on the main supporting wheel M, and the power wheel P which is carried by the framework, it follows that the main wheel must be adjusted through an arc struck around the center of said power wheel so that the driving connection will be maintained during the adjustment and afterward. Hence the use of quadrant racks Q bolted or riveted at R to the main frame F and to oblique braces O so as to give sufficient rigidity thereto, and means for adjusting the axle A of the main wheel M in said rack so that in effect the latter moves up and down over the axle to raise or lower the framework and therefore the entire machine. No novelty is claimed for the parts thus far described.

Coming now to the present invention, the quadrant rack Q in the present case has an extension 1 at its lower end which is in effect a duplication of its upper end pivoted thereto at 2 so that the extension will be offset from the body Q of the rack when folded up around the frame F as seen in Fig. 3, where it is adapted to be held in place by a suitable latch 3. When unlatched and dropped as shown in Fig. 1, the lower end or extension of the quadrant rack is preferably held rigid with the frame by means of a brace 4 properly bolted to the frame and to the rack, but this brace must of course be removed when the rack is to be folded as seen in Fig. 3. This rack is struck on an arc around the center of the power wheel P for the purpose above described, and is provided with teeth 5 in its inner face, and with these teeth engages a gear wheel 6 which is fast on the outer extremity of a shaft 7 that is journaled through the tubular axle A. Said shaft carries a worm gear 8, preferably mounted within a proper housing or casing 9 carried by the shaft 7 and loosely surrounding the same, and with this gear engages a worm 10 which is fast on the lower end of a shaft 11 that leads obliquely upward and rearward and loosely through an eye 12 and is cranked at its upper end as at 13. The inner end of the shaft 7 carries another gear 14 engaging the teeth of a similar quadrant Q' inside the main wheel M, but the lower section 15 of this rack is connected with the upper section Q' by offset or butt-hinges 16 so disposed that such section may fold inwardly beneath the frame as seen in Fig. 3, where it is supported horizontally by a spring latch 17. In other respects the construction of the inner quadrant rack and its extension is much the same as that of the outer, and of course these two racks must stand in parallelism. It follows that when the crank shaft is rotated by its handle, the worm engaging the worm gear turns the shaft 7 and the latter rotates the gears at its extremities and causes them to travel upward or downward on the teeth in the two quadrant racks. By preference the length of the main quadrant-rack-sections Q and Q' is sufficient for all ordinary adjustments, but when the machine is to be raised extremely high as for topping, the extensions are unlatched and dropped, and the lower brace or braces applied; and thereafter the crank shaft can be rotated to cause the shaft 7 to turn so that its gears will travel down to the extreme lower ends of the quadrant-extensions, with the result that the frame will be raised higher than usual. As this adjustment does not occur very often, I do not consider it burdensome to attach and detach the braces for the quadrant-extension when necessary.

The means for adjusting the grain wheel at the other side of the machine possess many of the characteristics above set forth, but as this wheel runs idly over the ground and is not connected with a power wheel or other point around which it must move in an arc, it can be adjusted on strict vertical lines. The hub of this wheel is mounted on a stub axle 20 which is secured by a bracket 21 to the lower end of an upright standard 22 having pins 23 in one edge whereby it becomes in effect a rack bar, and the upper end of this standard is preferably notched out as shown at 25.

The numeral 26 designates an extension of the standard notched out at its lower end as at 25' to fit the upper end of the main standard, and a bolt 27 or similar fastening device connects these two members so that when necessary the standard may be elongated as seen in Figs. 7 and 8. Such standard and its extension moves in a guide 30 (see Fig. 9) whose lower end has an extension 31 pivoted to the main portion of the guide at 32 as seen in Fig. 6, whereby said extended lower end of the guide may be folded inwardly under the frame F and latched as at 33 as seen in this view. Mounted in a suitable casing 34 is a worm wheel 35 secured to the lower end of a shaft 36 which has a crank or operating handle 37 at its upper end as seen in Fig. 5, and it is obvious that when this crank is rotated the worm wheel engaging the standard and its extension will cause the guide to travel upward or downward thereon as desired. During all ordinary adjustments the main portion of the standard and the upper portion of the guide are thus moved relatively to each other, but when it is desired to raise the machine quite high, as for topping, etc., the extension of the guide is let down from the position shown in Fig. 6 to that seen in Fig. 8, and the extension of the standard is added as shown, and thereafter the crank handle may be turned to cause the worm wheel to lift the guide and with it the main frame F quite high so that it travels along the teeth or pins to nearly the upper end of the standard and the latter in effect is depressed. I would provide suitable oblique braces O' for holding the lower end of the extension of the guide rigidly beneath the frame F as seen in Fig. 5, and I would leave it optional with the builder whether the extended portion need have additional braces as shown with respect to the main wheel in Fig. 1, although I should prefer that at this (the grainward) side of the machine these braces would be used. Thus it will be seen that I have produced a machine wherein both the main and the grain wheels may be adjusted in their curved and straight lines respectively, to considerably lower points relative to the main frame than usual, and this is permitted by hinging the lower portions or extensions of the guides in which move the members respectively carrying said wheels. As above stated, under ordinary conditions these hinged portions or extensions are raised and latched so as to be out of the way, and the machine is then susceptible of only the ordinary adjustments; but when it becomes desirable to raise the framework quite high, the extensions are let down and then the supports for the main and grain wheels may be run down and adjusted within the lower portions of the guides which said extensions form at this time. The materials and proportions of parts are not essential to the successful operation of this invention.

What is claimed as new is:

1. In a harvester, the combination with the main frame, its supporting wheels, and means for adjusting the frame vertically with respect to the axle of one wheel; of a guide comprising a main section secured to said frame and an extension section pivoted to the main section, a latch for supporting said extension section when swung out of line with the other section, and means for adjusting said sections relatively to the axle of the other wheel when such sections stand in alinement.

2. In a harvester, the combination with the main frame, and its supporting wheels, of a guide comprising a main section secured to said frame and an extension pivoted to the main section, a latch for supporting said extension section when swung out of line with the other section, said sections having teeth, a crank shaft loosely mounted in the main frame, and worm-gear connections between said shaft and teeth for adjusting the frame and guide vertically with respect to the axle of one of said wheels.

3. In a harvester, the combination with the main frame, its supporting wheels, and means for adjusting the frame vertically with respect to one of said wheels; of a guide comprising a main section secured to said frame and an extension pivoted to the main section, a latch for supporting said extension section when swung out of line with the other section, said sections having teeth, a gear engaging the latter, a worm wheel connected with said gear, a worm engaging said worm wheel, and a crank shaft rotatably mounted in the frame and rigidly connected with said worm.

4. In a machine of the class described, the combination with the main frame, the grain wheel adjustably carried at one side of the same, the main wheel at the other side of the same, a power wheel mounted in a fixed bearing in said frame and connected with the mechanism of the harvester, and a bull wheel on the main wheel connected with said power wheel; of a quadrant rack carried by the main frame and struck on an arc around said power wheel, an extension of said rack pivoted to the main portion thereof and adapted to stand in the same arc when it projects below said main frame, means for holding it elevated when out of use, a gear engaging the teeth of the rack, a shaft for said gear mounted in the hub of the main wheel, a worm gear fast on said shaft, and a crank handle and worm connection with said worm, for the purpose set forth.

5. In a machine of the class described, the combination with the main frame, the grain wheel adjustably carried at one side of the same, the main wheel at the other side of the same, a power wheel mounted in a fixed bearing in said frame and connected with the mechanism of the harvester, and a bull wheel on the main wheel connected with said power wheel; of quadrant racks carried by the main frame at each side of said main wheel and standing in arcs around its axis, quadrant extension-sections pivoted to the main portions of said racks and adapted to be dropped below said frame, latches for holding said extensions elevated when they are out of use, a shaft journaled through the hub of the main wheel, gears on said shaft engaging the teeth of said racks, and manually controlled means for turning said shaft in either direction, for the purpose set forth.

6. In a machine of the class described, the combination with a wheel mounted on an axle, a standard rising therefrom and notched at its upper end, and a standard-extension notched at its lower end and adapted to be engaged with the upper end of said standard, said standard having teeth throughout its length; of the main framework of the machine, a guide carried thereby and in which said standard is slidably mounted, a guide-extension pivoted to the lower end of the main portion of the guide, a casing carried by the latter, a worm wheel in said casing engaging said teeth, and a shaft and crank handle for rotating said worm wheel, for the purpose set forth.

In testimony whereof I have hereunto set my hand in presence of two subscribing witnesses.

GEORGE H. PALLADY.

Witnesses:
N. L. COLLAMER,
L. O. HILTON.

---

Copies of this patent may be obtained for five cents each, by addressing the "Commissioner of Patents, Washington, D. C."